(12) United States Patent
Mildner et al.

(10) Patent No.: US 8,220,864 B2
(45) Date of Patent: Jul. 17, 2012

(54) FRONT STRUCTURE FOR A MOTOR VEHICLE

(75) Inventors: Udo Mildner, Limburg (DE); Lothar Teske, Aschaffenburg (DE); Thomas Enderich, Huenstetten (DE)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 12/571,066

(22) Filed: Sep. 30, 2009

(65) Prior Publication Data
US 2010/0109383 A1 May 6, 2010

(30) Foreign Application Priority Data
Sep. 30, 2008 (DE) .................. 10 2008 049 762

(51) Int. Cl.
*B62D 25/08* (2006.01)
(52) U.S. Cl. ............... 296/187.09; 296/193.09
(58) Field of Classification Search ............ 296/187.01, 296/187.03, 187.09, 193.09, 203.01, 203.02
See application file for complete search history.

(56) References Cited

U.S. PATENT DOCUMENTS
5,580,122 A    12/1996    Muehlhausen

FOREIGN PATENT DOCUMENTS
| DE | 4409081 C1 | 4/1995 |
|----|------------|--------|
| DE | 202004011120 U1 | 11/2005 |
| EP | 0370342 A2 | 5/1990 |
| EP | 0494562 A1 | 7/1992 |

OTHER PUBLICATIONS

German Patent Office, German Search Report for Application No. 102008049762.2, dated Aug. 19, 2009.

*Primary Examiner* — H Gutman
(74) *Attorney, Agent, or Firm* — Ingrassia Fisher & Lorenz, P.C.

(57) ABSTRACT

A front structure for a motor vehicle has a front wall with a stiffening element formed at least partially of plastic situated in a crossbeam on the lower half of the front wall. The stiffening element is enclosed between a bulkhead plate coupled to a front frame and the front wall which provides a high level of rigidity of the crossbeam. The front structure additionally has reduced weight due to the plastic stiffening element.

15 Claims, 5 Drawing Sheets

FRONT STRUCTURE FOR A MOTOR VEHICLE

CROSS-REFERENCE TO RELATED APPLICATION

This application claims priority to German Patent Application No. 102008049762.2, filed Sep. 30, 2008, which is incorporated herein by reference in its entirety.

TECHNICAL FIELD

The invention relates to a front structure for a motor vehicle having a front wall which delimits a passenger compartment in the travel direction, having a front frame situated in front of the front wall, and having a crossbeam.

BACKGROUND

A crossbeam for such a front structure is known, for example, from DE 20 2004 011 120 U1. The crossbeam has two half shells, between which an insert part is fastened and situated between two A columns of the motor vehicle. The half shells and the insert part are manufactured from sheet metal and generate a provided stability of the crossbeam. A high stability of the area of the crossbeam is necessary in order to protect the occupants of the motor vehicle in the event of a crash. A front structure equipped with the known crossbeam has the disadvantage that it has a very high weight. In addition, the crossbeam is composed of a plurality of sheet-metal plates, which are complex to install.

The invention is based on the problem of designing a front structure of the type cited at the beginning so that it has a particularly low weight and ensures a high rigidity of the motor vehicle in the area of the front wall.

SUMMARY

This problem is solved according to the invention in that the crossbeam has a stiffening element made of plastic.

Through this design, the crossbeam which is provided in any case is stiffened by the stiffening element. This stiffening ensures a high rigidity of the motor vehicle in the area of the front wall and thus allows a high level of crash safety of the motor vehicle equipped with the front structure according to the invention. Because the stiffening element is manufactured from plastic, the front structure thus has a particularly low weight. The stiffening element can be manufactured from plastic in the injection-molding method or from a fiber-reinforced resin.

The crossbeam which stiffens the front wall typically has a bulkhead plate fastened to the front wall. According to another advantageous embodiment of the invention, the stiffening element is capable of stiffening such a crossbeam easily if the stiffening element is situated between a bulkhead plate fastened to the front wall and the front wall and if the front wall and the bulkhead plate enclose the stiffening element. The stiffening element is mounted positively between the front wall and the bulkhead plate by the positive enclosure. A screw connection of the stiffening element to adjoining components is not necessary thanks to the invention.

According to another advantageous embodiment of the invention, the crossbeam having the stiffening element has a high stability if the stiffening element is situated below a reinforcement plate which connects the bulkhead plate to the front wall.

It contributes to further increasing the stability of the crossbeam having the stiffening element, according to another advantageous embodiment of the invention, if the stiffening element is designed as linear between two longitudinal girders of the front frame.

It contributes to further increasing the stability of the front structure according to an embodiment of the invention if the stiffening element connects two plates of wheel wells which are fastened to the front wall.

Twisting of the wheel wells in the event of a crash of the motor vehicle may be avoided easily according to another advantageous embodiment of the invention if the stiffening element is guided from the lower half of the front wall up to above the wheel wells in the upper half of the front wall.

The crossbeam having the stiffening element is designed particularly compactly and has a low weight according to another advantageous embodiment of the invention if the stiffening element is designed as tapering in cross-section toward its lower end. Through this design, the stiffening element has a higher material strength in an area distant from a floor plate of the motor vehicle than close to the floor plate, which is typically very stiff in any case. The front wall is thus deliberately stiffened at the point at which particularly high forces act in the event of a crash.

The crossbeam having the stiffening element is particularly rigid according to another advantageous embodiment of the invention if the stiffening element has reinforcement ribs pointing in the intended travel direction of the motor vehicle. The reinforcement ribs are preferably situated in a lattice or honeycomb.

The manufacturing of different stiffening elements for left-hand and right-hand drive vehicles may be avoided easily according to another advantageous embodiment of the invention if the stiffening element has two steering passages.

The crossbeam having the stiffening element is prepared for assuming manifold functions if the stiffening element has a channel for a water drain and/or an opening for a wiring passage. The integration of the channel for the water drain in the stiffening element manufactured from plastic also has the advantage that the function of a water chamber can also be integrated easily in the crossbeam having the stiffening element. Penetrating water is thus kept away from components made of sheet metal by the plastic of the stiffening element. The stiffening element thus contributes to protecting the crossbeam from corrosion.

Annoying rattling noises from the stiffening element may be avoided easily according to another advantageous embodiment of the invention if the stiffening element has at least one trough open toward an adjoining component and a seal is situated in the trough. The seal prevents or damps relative movements of the stiffening element relative to the front wall and the bulkhead wall. Furthermore, in this way the steering passages, the wiring passage, and/or the water drain may be sealed easily. The seal preferably comprises a foaming material which cures in a drying furnace of a painting shop.

The installation and orientation of the stiffening element to adjoining components is particularly simple according to another advantageous embodiment of the invention if the stiffening element is manufactured integrally with a centering element which penetrates into the front wall or the bulkhead plate.

It contributes to further simplifying the mounting of the stiffening element if the centering element has a detent hook which engages in the front wall or the bulkhead plate.

According to another advantageous embodiment of the invention, the stiffening element contributes to simplifying the installation of components to be situated in the motor vehicle if the centering element mounts insulation or further components to be situated in a motor vehicle using an end part which penetrates the front wall.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
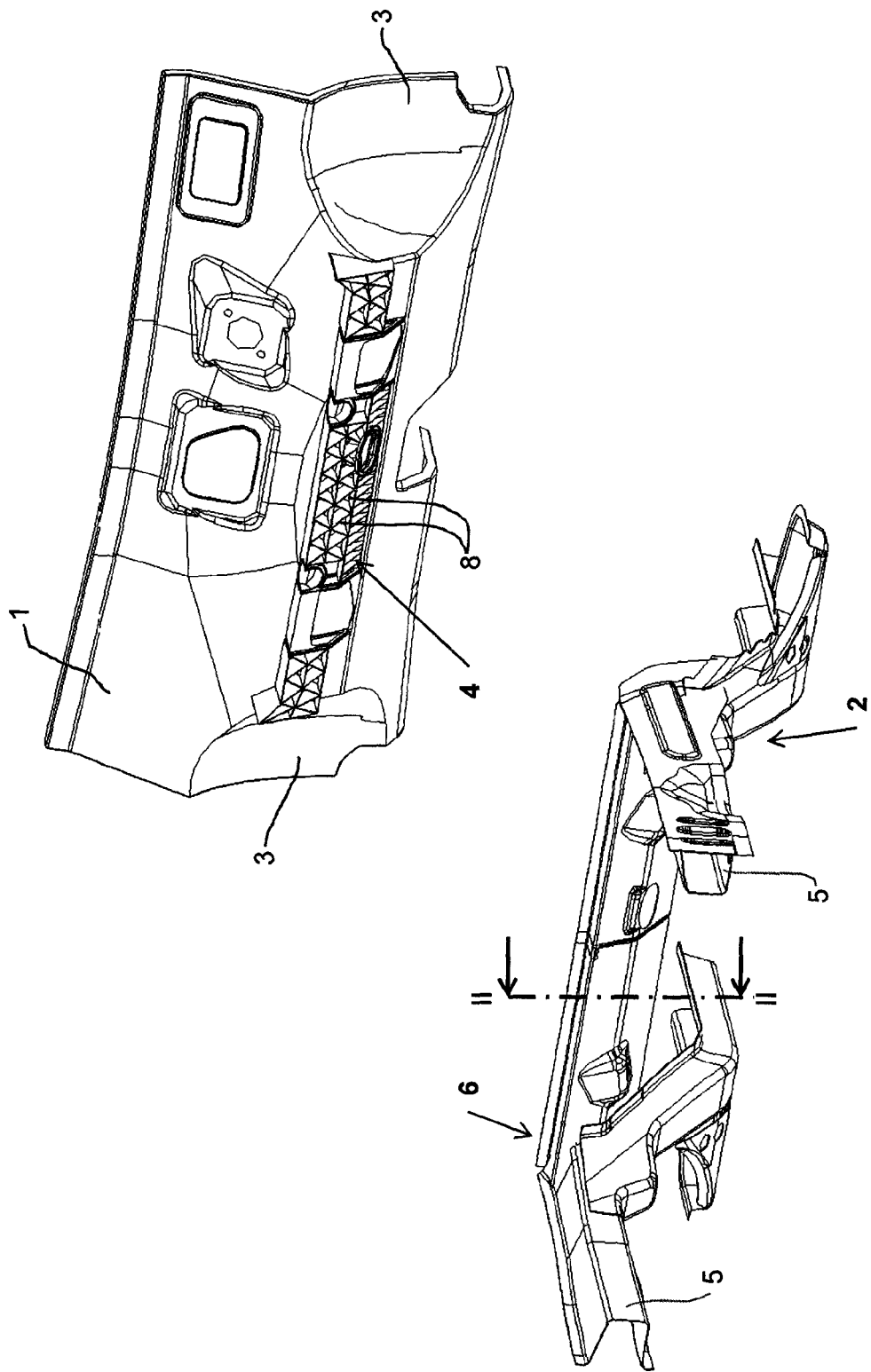
FIG. 1 shows a front structure according to the invention before installation.

FIG. 1 shows a front structure for a motor vehicle having a front wall 1, which delimits a passenger compartment in the travel direction, before the connection to a front frame 2. The front wall 1 is connected to plates 3 of two wheel wells, between which a stiffening element 4 made of plastic is situated. The front frame 2 has two laterally situated longitudinal girders 5, which point in the travel direction, and a bulkhead plate 6, which connects the longitudinal girders 5 to one another. The bulkhead plate 6, the front wall 1, and the stiffening element 4 form a crossbeam 7, which is shown in cross-section in FIG. 2, after installation. The stiffening element 4 has a plurality of stiffening ribs 8 situated in rhomboids and lattices in the travel direction. The stiffening element 4 is situated on the lower half of the front wall 1.

Figure 2:
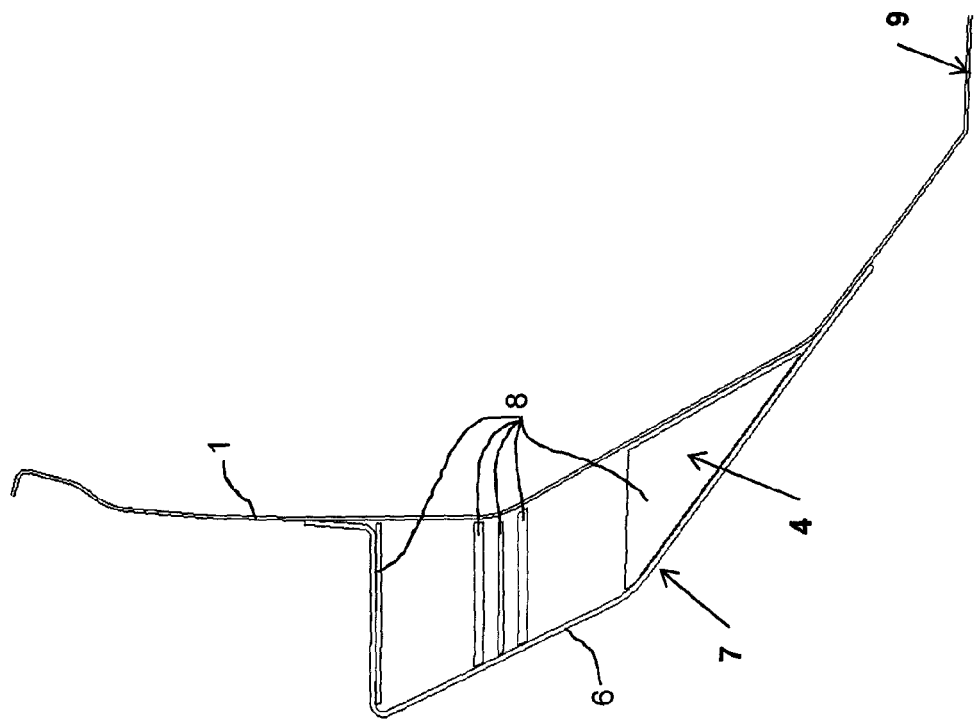
FIG. 2 shows an enlarged sectional illustration through the front structure from FIG. 1 along line II-II after installation.

FIG. 2 shows the crossbeam 7 in a sectional illustration along line II-II after the connection of the bulkhead plate 6 to the front wall 1. The connection of the bulkhead plate 6 to the front wall 1 can be performed in the welding method. It can be seen in FIG. 2 that the stiffening element 4 made of plastic is situated completely inside the crossbeam 7 and is enclosed by the bulkhead plate 6 and the front wall 1. The crossbeam 7 is designed as tapering toward a floor 9 of the motor vehicle. Furthermore, the reinforcement ribs 8 are recognizable in FIG. 2.

Figure 3:
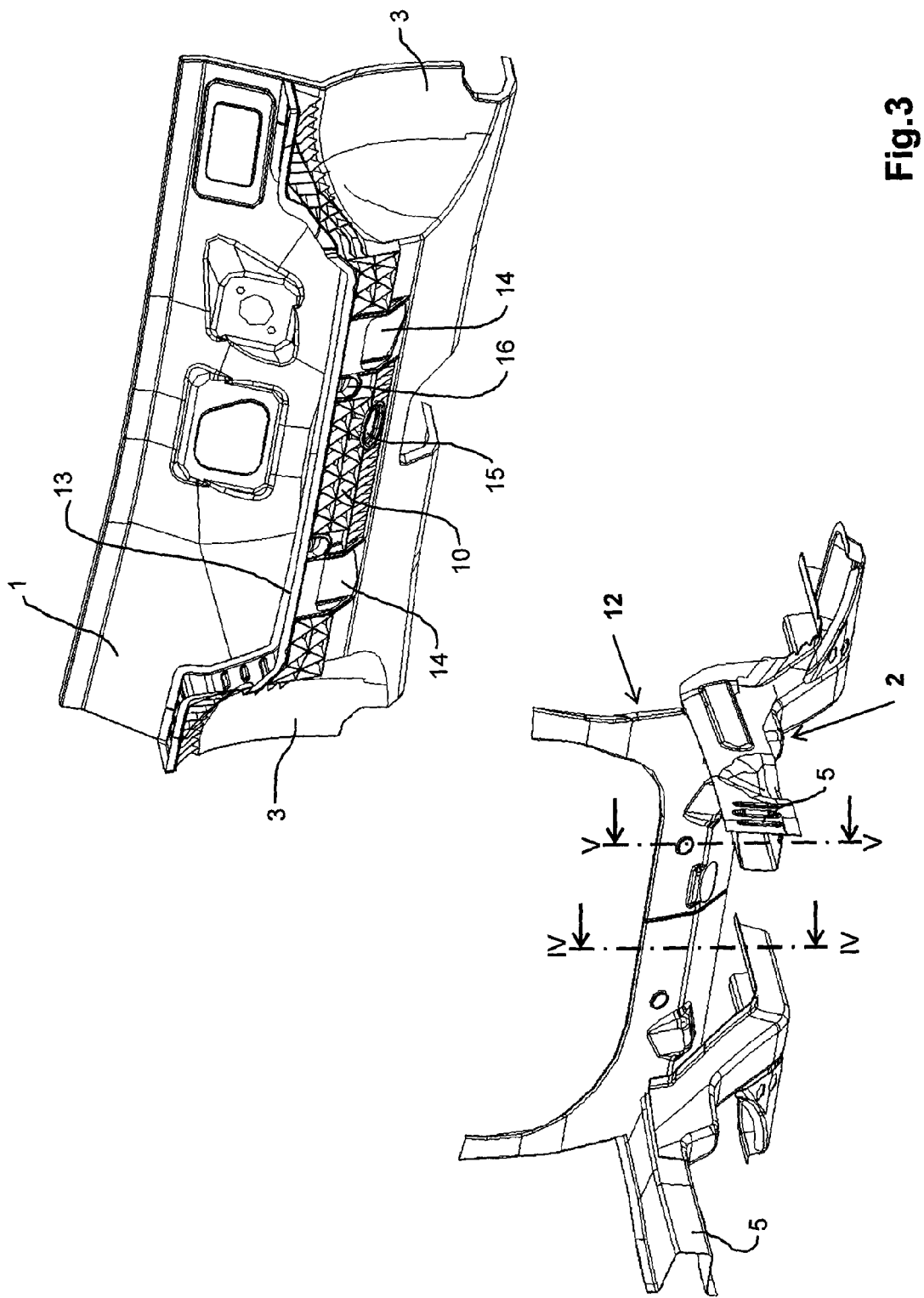
FIG. 3 shows a further embodiment of the front structure according to the invention.

FIG. 3 shows a further embodiment of the front structure, which differs from that from FIG. 1 only in that a stiffening element 10 is led up to above the plates 3 of the wheel wells. The stiffening element 10 is thus situated between the longitudinal girders 5 on the lower half of the front wall 1 and its end is lead into the upper half of the front wall 1. A bulkhead plate 11 of a front frame 12 is led upward like the stiffening element 10. The stiffening element 10 is covered on top by a reinforcement plate 13 fastened to the front wall 1. The bulkhead plate 11 and the stiffening element 10 have two steering passages 14 for right-hand and left-hand drive vehicles, a wiring passage 15, and a water drain 16.

Figure 4:
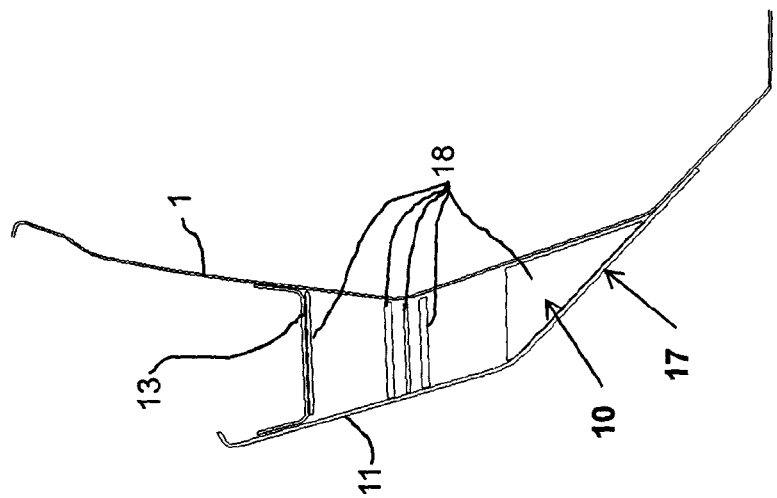
FIG. 4 shows an enlarged sectional illustration through the front structure from FIG. 3 along line IV-IV after installation.

FIG. 4 shows a crossbeam 17 generated after the connection of the front frame 12 to the front wall 1 in a sectional illustration along line IV-IV from FIG. 3. It can be recognized that the reinforcement plate 13 is also fastened to the bulkhead plate 11. The stiffening element 10 has reinforcement ribs 18 and is enclosed by the front wall 1, the bulkhead plate 11, and the reinforcement plate 13.

Figure 5:
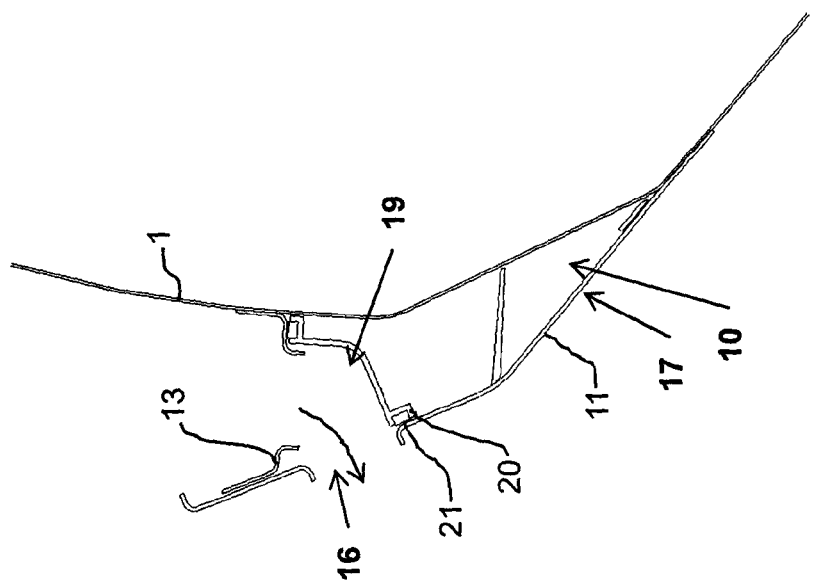
FIG. 5 shows an enlarged sectional illustration through the front structure from FIG. 3 along line V-V after installation.

FIG. 5 shows, in a sectional illustration along line V-V from FIG. 3 in the area of the water drain 16, that the stiffening element 10 has a channel 19, using which water is guided inside the crossbeam 17. The channel 19 is sealed via a seal 21 situated in a trough 20.

Figure 6:
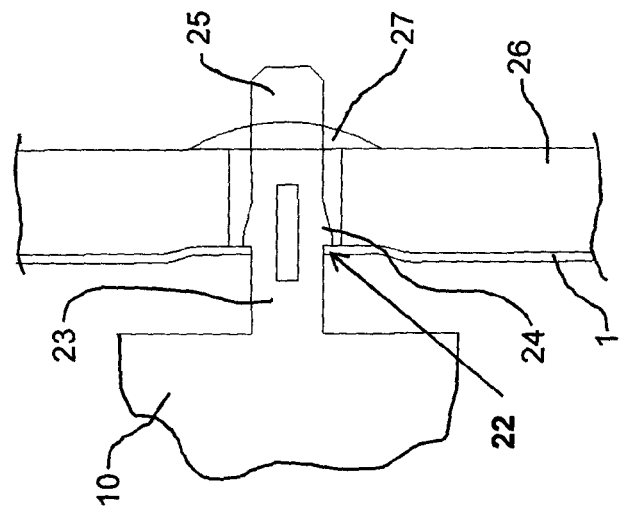
FIG. 6 shows an enlarged sectional illustration through a subarea of a front wall.

FIG. 6 shows a sectional illustration through a subarea of the stiffening element 10 fastened on the front wall 1. The stiffening element 10 has a centering element 23, which penetrates a hole 22 in the front wall 1, having a detent hook 24. The detent hook 24 allows fixing of the stiffening element 10 on the front wall 1. Furthermore, a free end part 25 of the centering element 23 protrudes beyond the front wall 1. For example, insulation 26 is fastened using a retaining clip 27 on the end part of the centering element 23 penetrating the front wall 1.

Figure 7:
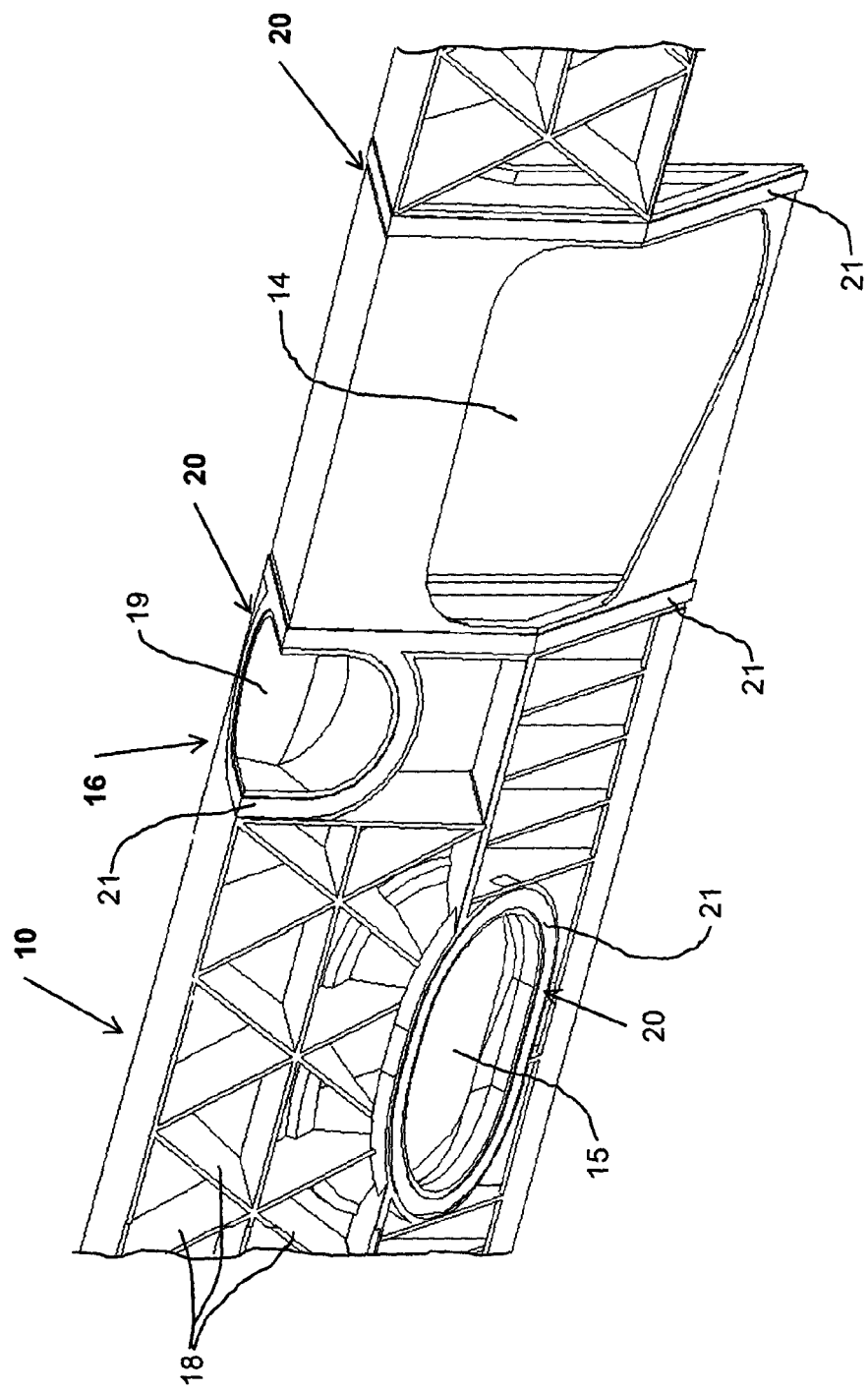
FIG. 7 shows an enlarged subarea of a stiffening element of the front structure according to an embodiment of the invention.

FIG. 7 shows a perspective view of a subarea of the stiffening element 10. It can be seen that the wiring passage 15, the steering passage 14, and the channel 19 of the water drain 16 each have an open peripheral trough 20 for receiving the seal 21.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front structure for a motor vehicle, comprising:
   a front wall that delimits a passenger compartment in a travel direction;
   a front frame is situated in a front of the front wall and comprising a crossbeam that comprises a stiffening element at least partially made of plastic and situated on a lower half of the front wall; and
   a bulkhead plate fastened to the front wall so as to position the stiffening element between the bulkhead plate and the front wall with the front wall and the bulkhead plate at least partially enclosing the stiffening element.

2. The front structure according to claim 1, wherein the stiffening element is substantially linear between two longitudinal girders of the front frame.

3. The front structure according to claim 1, wherein the stiffening element couples two plates of wheel wells that are fastened on the front wall.

4. The front structure according to claim 1, wherein the stiffening element is tapered in cross-section toward a lower end.

5. The front structure according to claim 1, wherein the stiffening element comprises a reinforcement rib.

6. A front structure for a motor vehicle, comprising:
   a front wall that delimits a passenger compartment of the motor vehicle;
   a front frame including two longitudinal girders coupled to the front wall and having a crossbeam extending between the two longitudinal girders with a stiffening element at least partially made of plastic; and a bulkhead plate fastened to the front wall and the two longitudinal girders wherein the stiffening element is between and at least partially enclosed between the bulkhead plate and the front wall.

7. The front structure according to claim 6, wherein the stiffening element also extends between two wheel wells that are fastened to the front wall.

8. The front structure according to claim 6, wherein the stiffening element is tapered in cross-section toward a lower end.

9. The front structure according to claim 6, wherein the stiffening element further comprises ribs.

10. The front structure according to claim 6, wherein the ribs are configured to have a shape selected from the following group of shapes: rhomboids, lattices or honeycombs.

11. A front structure for a motor vehicle, comprising:
   a front wall that delimits a passenger compartment of the motor vehicle;
   a front frame including two wheel wells coupled to the front wall and having a crossbeam extending between the two wheel wells with a stiffening element at least partially made of plastic; and
   a bulkhead plate fastened to the front wall and two longitudinal girders of the front frame wherein the stiffening element is between and at least partially enclosed between the bulkhead plate and the front wall.

12. The front structure according to claim 11, wherein the stiffening element also extends between two longitudinal girders that are fastened to the front wall.

13. The front structure according to claim 11, wherein the stiffening element is tapered in cross-section toward a lower end.

14. The front structure according to claim 11, wherein the stiffening element further comprises ribs.

15. The front structure according to claim 11, wherein the ribs are configured to have a shape selected from the following group of shapes: rhomboids, lattices or honeycombs.

* * * * *